US006992743B2

(12) United States Patent
Sasabayashi (10) Patent No.: US 6,992,743 B2
(45) Date of Patent: Jan. 31, 2006

(54) LIQUID CRYSTAL DISPLAY DEVICE

(75) Inventor: Takashi Sasabayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/697,713

(22) Filed: Oct. 30, 2003

(65) Prior Publication Data

US 2004/0125296 A1    Jul. 1, 2004

(30) Foreign Application Priority Data

Oct. 31, 2002  (JP)  ............................. 2002-318328

(51) Int. Cl.
  *G02F 1/1343*  (2006.01)
  *G02F 1/1337*  (2006.01)
(52) U.S. Cl. ..................... 349/143; 349/129
(58) Field of Classification Search ................ 349/129, 349/143, 117, 96
  See application file for complete search history.

(56) References Cited

U.S. PATENT DOCUMENTS

| 6,587,173 B2 * | 7/2003 | Yoo et al. ................... 349/129 |
| 6,600,539 B2 * | 7/2003 | Song ........................... 349/130 |
| 6,700,635 B2 * | 3/2004 | Kwag et al. ................ 349/139 |
| 6,710,837 B1 * | 3/2004 | Song et al. ................. 349/143 |
| 6,778,244 B2 * | 8/2004 | Song et al. ................. 349/129 |
| 2005/0062924 A1 * | 3/2005 | Ahn et al. .................. 349/143 |

FOREIGN PATENT DOCUMENTS

| JP | 9-211445 | 8/1997 |
| JP | 11-242225 | 9/1999 |
| JP | 2000-029010 | 1/2000 |

OTHER PUBLICATIONS

Iwamoto et al.; "Multi-Domain Vertically-Aligned LCDs using Circular Polarizers"; *Papers in the Panel Discussion, Japanese Assoc. of Liquid Crystals.*

* cited by examiner

*Primary Examiner*—Toan Ton
(74) *Attorney, Agent, or Firm*—Greer, Burns & Crain, Ltd.

(57) ABSTRACT

A liquid crystal display device comprises a first substrate and a second substrate facing each other and maintaining a predetermined cell gap, liquid crystals sealed between the substrates, and a pixel electrode formed on the first substrate on the side facing the liquid crystals. A common electrode is formed on the second substrate on the side facing the liquid crystals. First slits are formed in the pixel electrode, and second slits are formed in the common electrode. The second slits extend in a direction nearly at right angles with the direction in which the first slits extend, as viewed in a direction perpendicular to the substrate surface.

7 Claims, 8 Drawing Sheets

LIQUID CRYSTAL DISPLAY DEVICE

BACKGROUND OF THE INVENTION

1. Field of the Invention

This invention relates to a liquid crystal display device used for a display unit of information equipment and, more particularly, to a liquid crystal display device for which a wide viewing angle and a high brightness are required.

2. Description of the Related Art

In recent years, liquid crystal display devices of the active matrix type having a thin film transistor (TFT) for each of the pixels have been widely used in a variety of applications owing to their such features as small thickness, reduced weight, operating on low voltages and consuming less electric power. Modern liquid crystal display devices are realizing a large screen with high precision yet maintaining a wide viewing angle, improved brightness and increased contrast. Therefore, there are realized display characteristics comparable to those of a CRT (cathode-ray tube), lending the liquid crystal display device well suited even for such applications as monitors and TV receivers which have, so far, chiefly employed the CRT.

In a liquid crystal display device of the VA (vertically aligned) mode which drives the liquid crystal molecules in a vertically aligned manner, the liquid crystal molecules are tilted in various directions when a voltage is applied unless the alignment film is subjected to the alignment treatment such as rubbing. As a result, alignment regions of different areas are formed on the pixels. In each pixel, further, a boundary line (discrination) of the alignment region is seen as a dark line which is differently arranged for each of the pixels. Therefore, when the display screen is viewed from a tilted direction, there are seen shading, roughness and residual image on the display screen causing the quality of display to be very decreased. As a liquid crystal display device for realizing display characteristics comparable to those of the CRT, therefore, there has been put into practical use a liquid crystal display device realizing a wide viewing angle by utilizing an alignment dividing system such as MVA (multi-domain vertical alignment)(see, for example, Japanese Patent No. 2947350).

A liquid crystal panel of the MVA system has domain regulating means such as protrusions, dents or slits formed in the electrodes or a combination thereof on at least one surface of either one of a pair of substrates. As a liquid crystal material, there are used nematic liquid crystals having a negative dielectric anisotropy. When no voltage is applied, the liquid crystals are such that the liquid crystal molecules are aligned nearly perpendicularly to the substrate. When a voltage is applied, the domain regulating means so works that the azimuths of alignment in which the liquid crystal molecules are tilted are regulated to a plurality of azimuths in each pixel. Polarizer elements are arranged on both sides of the liquid crystal panel such that the axes of absorption are at right angles with each other.

Figure 8A:
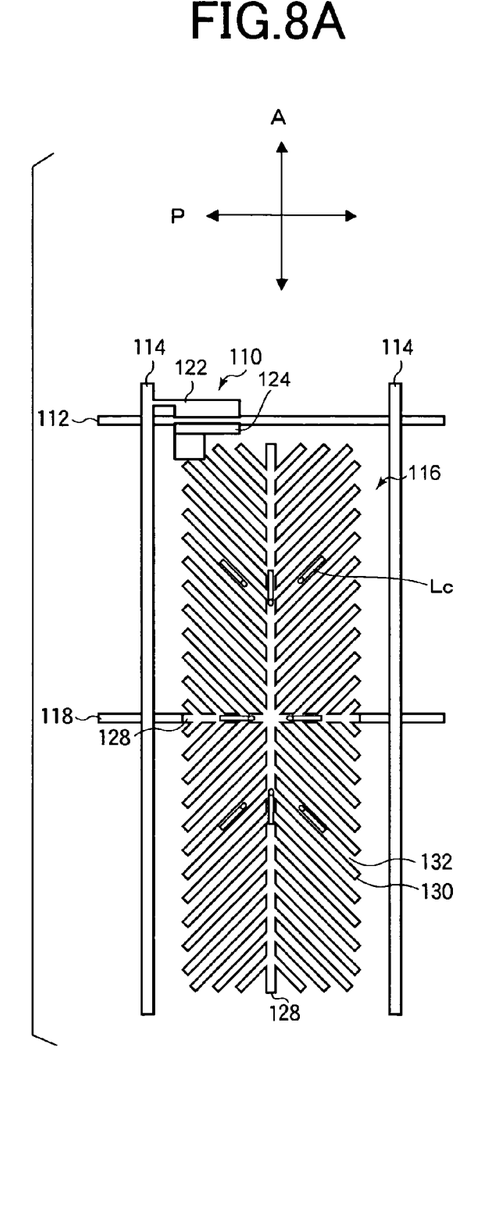
FIGS. 8A and 8B are diagrams schematically illustrating the constitution of a TFT substrate of an MVA-LCD.
Figure 8B:
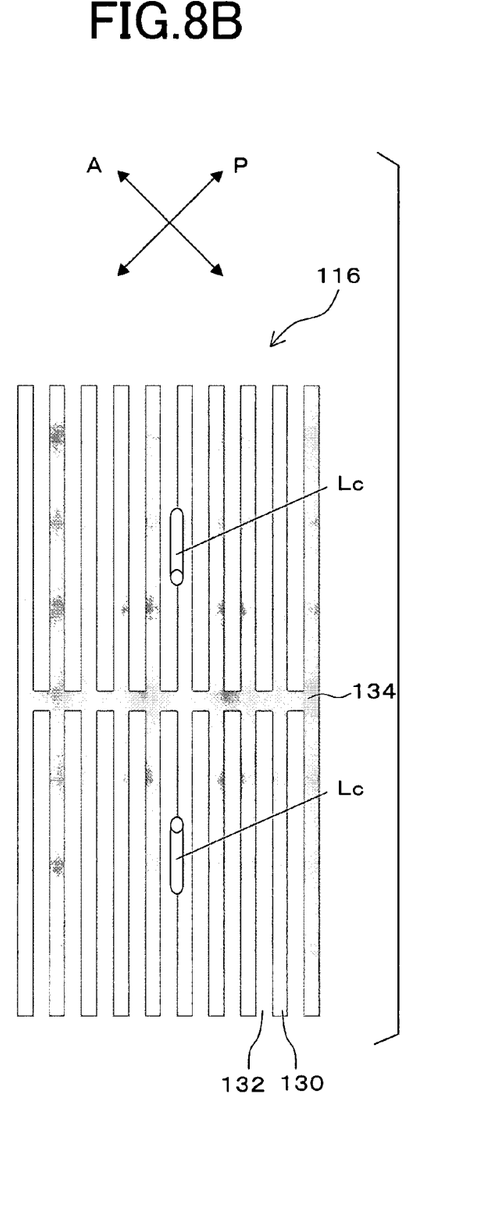

FIGS. 8A and 8B illustrate the constitution of a pixel on a TFT substrate in a conventional liquid crystal display device of the MVA type, FIG. 8A illustrating the structure of a pixel electrode for realizing four-divided alignment and FIG. 8B illustrating the structure of a pixel electrode for realizing upper and lower two-divided alignment. On the TFT substrate as shown in FIG. 8A, there are formed a plurality of gate bus lines 112 extending in the right-and-left direction and nearly in parallel with each other. A plurality of drain bus lines 114 are formed nearly in parallel with each other extending up and down in the drawing and intersecting the gate bus lines 112 via an insulating film that is not shown. Regions surrounded by the plurality of gate bus lines 112 and drain bus lines 114 serve as pixel regions.

Further, a storage capacitor bus line 118 is formed extending nearly in parallel with the gate bus lines 112, and traversing nearly the center of the pixel region.

A TFT 110 is formed near a position where the gate bus line 112 and the drain bus line 114 intersect each other. A drain electrode 122 of the TFT 110 is drawn from the drain bus line 114 so as to be positioned on one end side of an active semiconductor layer formed on the gate bus line 112 and of a channel protection film (both of which are not shown) formed thereon. On the other hand, a source electrode 124 of the TFT 110 is so formed as to be opposed to the drain electrode 122 maintaining a predetermined gap and is positioned on the other end side of the active semiconductor layer and of the channel protection film. A region of the gate bus line 112 just under the channel protection film works as a gate electrode of the TFT 110. Further, the source electrode 124 is electrically connected to the pixel electrode 116 via a contact hole (not shown).

A pixel electrode 116 is formed in the pixel region. Referring to FIG. 8A, the pixel electrode 116 includes trunk portions 128 extending nearly in parallel with, or perpendicularly to, both bus lines 112 and 114, branch portions 130 branching from the trunk portions 128 and extending aslant, and slits 132 among the neighboring branch portions 130. On an opposing substrate stuck to the TFT substrate and facing thereto maintaining a predetermined cell gap, there are formed a transparent electrode (not shown) on the whole surface of the display region including a plurality of pixel regions. In the MVA-LCD fabricated by using the TFT substrate shown in FIG. 8A and the opposing substrate that is not shown, the directions for aligning the liquid crystal molecules are determined by the trunk portions 128 of the pixel electrode 116, branch portions 130 and slits 132.

Liquid crystals having a negative dielectric anisotropy are sealed between the two substrates. Liquid crystal molecules are aligned nearly perpendicularly to the surface of the substrate due to the alignment-regulating force of vertically alignment films (not shown) formed on the opposing surfaces of the two substrates. The branch portions 130 and the slits 132 in FIG. 8A have widths which are both, for example, 3 $\mu$m, and the pitches among the branch portions and among the slits are both 6 $\mu$m. With the slit structure which is as fine as the above-mentioned degree, the liquid crystal molecules Lc are tilted in the directions in parallel with the directions in which the slits 132 are extending when a voltage is applied thereto. When a predetermined voltage is applied across the transparent electrodes of the two substrates and the liquid crystal molecules Lc start being tilted along the directions in which the slits 132 are extending, the tilted state propagates successively to the liquid crystal molecules Lc, and the liquid crystal molecules Lc are tilted in the same directions among the slits 132.

Thus, upon arranging the slits 132 in the pixel electrode 116, it is allowed to regulate the direction of tilt of the liquid crystal molecules Lc for each of the regions. If the slits 132 are formed in two directions which are nearly perpendicular to each other as shown in FIG. 8A, the liquid crystal molecules are tilted in four directions in each pixel. Since the viewing angle characteristics of the regions are mixed together, a wide viewing angle is obtained by the MVA-LCD in the white display or in the black display. In the MVA-LCD, a contrast ratio of not smaller than 10 is obtained even at an angle of 80 degrees in the up-and-down right-and-left directions from a direction perpendicular to the display screen.

As shown in FIG. 8A, therefore, when the slit electrodes are so formed that the liquid crystal molecules are tilted in the four directions, the alignments of four domains are realized. As shown in FIG. 8B, further, when the slit electrodes are so formed that the liquid crystal molecules are tilted in the two directions, the alignments of two domains are realized.

In the MVA-LCD using the pixel electrode 116 shown in FIGS. 8A and 8B, however, a response time becomes long from the application of a voltage until the propagation of alignment of the liquid crystal molecules Lc is completed. Therefore, there occur in a random fashion singular points in the alignment vector of the liquid crystal molecules Lc on the branch portions 130. Further, the positions where the singular points are formed migrate for each of the pixels or the frames. When the display screen is viewed from a tilted direction, in particular, there are observed shades and roughness on the display screen, causing the display quality to be deteriorated.

Next, described below with reference to FIGS. 8A to 9D is a relationship between the tilting azimuth of liquid crystal molecules Lc and the directions of axes of absorption of the two polarizing elements P and A. Referring to FIGS. 8A and 8B, the directions of axes of absorption of the two polarizing elements P and A are set being tilted by 45° from the azimuth of alignment of the liquid crystal molecules Lc of when they are tilted. FIGS. 9A to 9D illustrate a relationship between the tilting azimuth of the liquid crystal molecules Lc as seen in a direction perpendicular to the substrate surface and the directions of axes of absorption of the two polarizing elements P and A. FIG. 9A illustrates a case of when no voltage is applied where the liquid crystal molecules Lc are aligned perpendicularly to the substrate surface. On the other hand, light that has passed through one polarizing element P passes through the liquid crystals without affected by birefringence of the liquid crystal molecules, but is shut off by the other polarizing element A to exhibit a black display.

When a voltage is applied, the liquid crystal molecules Lc having a negative dielectric anisotropy are tilted with respect to the substrate surface. When a sufficiently large voltage is applied, the liquid crystal molecules Lc become nearly in parallel with the substrate surface. To realize an optimum white display, the azimuth of alignment of the liquid crystal molecules Lc receives regulation relative to the directions of axes of absorption of the polarizing elements P and A.

Figure 9A:
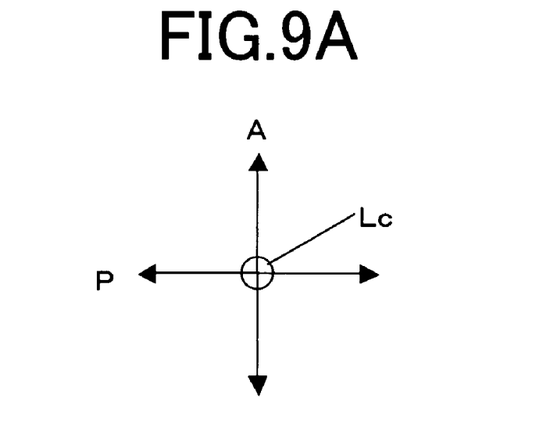
FIGS. 9A to 9D are diagrams illustrating the operation of when a voltage is applied to the liquid crystal molecules having a negative dielectric anisotropy.
Figure 9B:
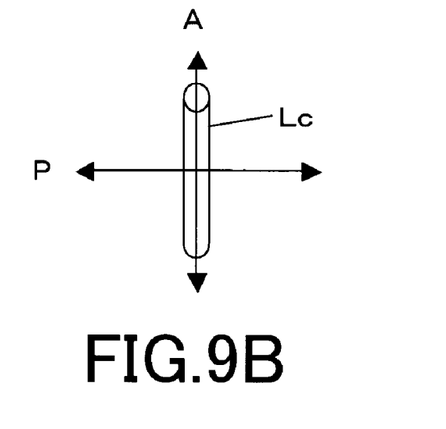

FIG. 9B illustrates a case where the liquid crystal molecules Lc are tilted in an azimuth to meet in parallel with, or at right angles with, the axes of absorption of the polarizing elements P and A. In this case, like when no voltage is applied, light that has passed through one polarizing element P passes through the liquid crystals without affected by birefringence of the liquid crystal molecules Lc, but is shut off by the other polarizing element A. Therefore, white display is not aligned.

Figure 9C:
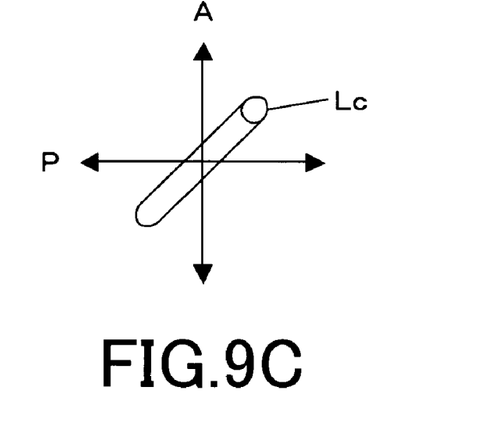

To obtain an optimum white display as shown in FIG. 9C, the azimuth of alignment of the liquid crystal molecules Lc must be 45° with respect to the axes of absorption of the polarizing elements P and A. In this case, linearly polarized beam that has passed through one polarizing element P becomes an elliptically polarized beam being affected by the birefringence of the liquid crystal molecules Lc, producing light that passes through the other polarizing element A. Therefore, white display is aligned.

Figure 9D:
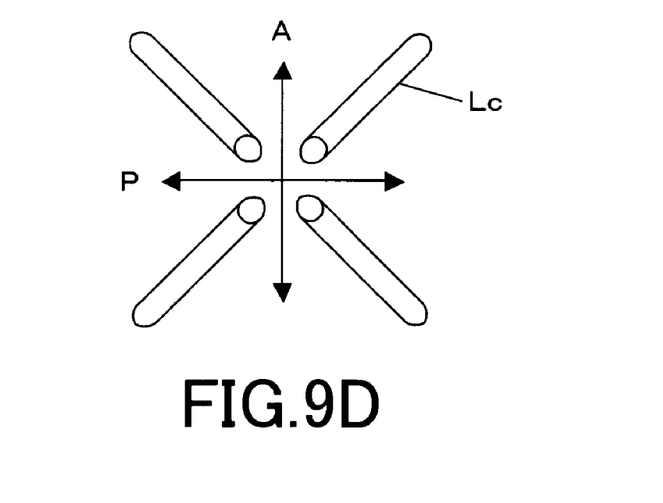

To obtain a favorable white display with the four-domain-divided MVA-LCD, therefore, the azimuths in which the liquid crystal molecules Lc are to be tilted and aligned when a voltage is applied are regulated to four azimuths shown in FIG. 9D.

Related Art documents are as follows:
JP-A-2000-29010
JP-A-9-211445
Japanese Patent No. 2947350
Papers in the Panel Discussion, Japanese Association of Liquid Crystals, by Iwamoto, Toko, Iimura, PCa02, 2000

With, for example, the four-domain-divided MVA-LCD as described above, it is desired that the azimuths in which the liquid crystal molecules Lc are tilted and aligned, are four azimuths only as shown in FIG. 9D. In practice, however, due to continuity of liquid crystals, there exist liquid crystal molecules Lc that are tilted in the azimuths other than the four azimuths shown in FIG. 9D.

In the MVA-LCD having a 4-domain electrode structure shown in FIG. 8A, for example, the liquid crystal molecules Lc are tilted in four different azimuths due to fine slits 132 which are so formed as to maintain angles of 45° relative to the axes of absorption of the polarizing elements P and A. In the regions of boundaries where the domains are neighboring each other, however, the liquid crystal molecules Lc are forced to be tilted in the azimuths which are in parallel with, or at right angles with, the axes of absorption of the polarizing elements P and A.

Light does not pass through the region where the liquid crystal molecules are tilted in the azimuths in parallel with, or at right angles with, the axes of absorption of the polarizing elements P and A. In the case of the electrode structure shown in FIG. 8A, therefore, a black region forms in a crossing manner on the white display, which is a major cause that decreases the transmission factor.

To tilt the liquid crystal molecules Lc in a predetermined direction, further, it is necessary to form a line-and-space pattern of a fine pitch as well as to form branch portions 130 of the electrode and slits 132 as shown in FIG. 8A. When a split exposure is employed at a step of photolithography to meet an increase in the size of the panel, however, the branch portions 130 and the slits 132 are formed having widths which are slightly different for each of the split regions due to a slight change in the exposure conditions, whereby shading occurs in the brightness on the display screen when an image is displayed on the panel, arousing a problem of a drop in the production yield.

SUMMARY OF THE INVENTION

It is an object of the present invention to provide a liquid crystal display device which features an improved production yield, wide viewing angle, high brightness and favorable display quality.

The above object is achieved by a liquid crystal display device comprising:

a first substrate and a second substrate facing each other maintaining a predetermined cell gap;

liquid crystals sealed between the first substrate and the second substrate;

a first electrode formed on the first substrate on the side that faces the liquid crystals;

a second electrode formed on the second substrate on the side that faces the liquid crystals;

first slits formed in the first electrode; and second slits formed in the second electrode, and extending in a direction nearly at right angles with the direction in which the first slits are extending as viewed in a direction perpendicular to the substrate surface.

DESCRIPTION OF THE PREFERRED EMBODIMENTS

A liquid crystal display device according to an embodiment of the invention will now be described with reference to FIGS. 1 to 7. First, the constitution of the liquid crystal display device according to the embodiment will be briefly described with reference to FIG. 1. The liquid crystal display device shown in FIG. 1 has a structure in which a TFT substrate 2 on which TFTs are formed and a CF substrate 4 on which color filters (CFs) are formed are stuck together facing each other, and liquid crystals are sealed between the two substrates 2 and 4.

Figure 2:
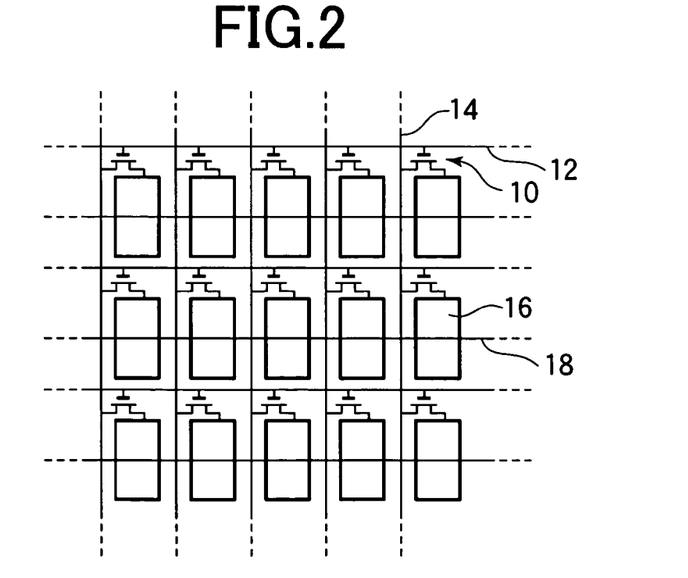
FIG. 2 is a view schematically illustrating an equivalent circuit of the liquid crystal display device according to the embodiment of the invention.

FIG. 2 schematically illustrates an equivalent circuit of elements formed on the TFT substrate 2. On the TFT substrate 2 are formed a plurality of gate bus lines 12 in parallel and extending in the right-and-left direction in the drawing. There are formed in parallel a plurality of drain bus lines 14 extending in the up-and-down direction in the drawing and intersecting the gate bus lines 12 via an insulating film. The regions surrounded by the plurality of gate bus lines 12 and drain bus lines 14 serve as pixel regions. A TFT 10 and a pixel electrode 16 are formed in each of the pixel regions arranged like a matrix. The drain electrode in each TFT 10 is connected to the neighboring drain bus line 14, the gate electrode is connected to the neighboring gate bus line 12, and the source electrode is connected to the pixel electrode 16. Storage capacitor bus lines 18 are formed nearly through the centers of the pixel regions in parallel with the gate bus lines 12. The TFTs 10, pixel electrodes 16, and bus lines 12, 14 and 18 are formed through steps of photolithography, i.e., formed by repeating a series of semiconductor process comprising "formation of film→coating of resist→exposure to light→developing→etching→peeling of resist".

Figure 1:
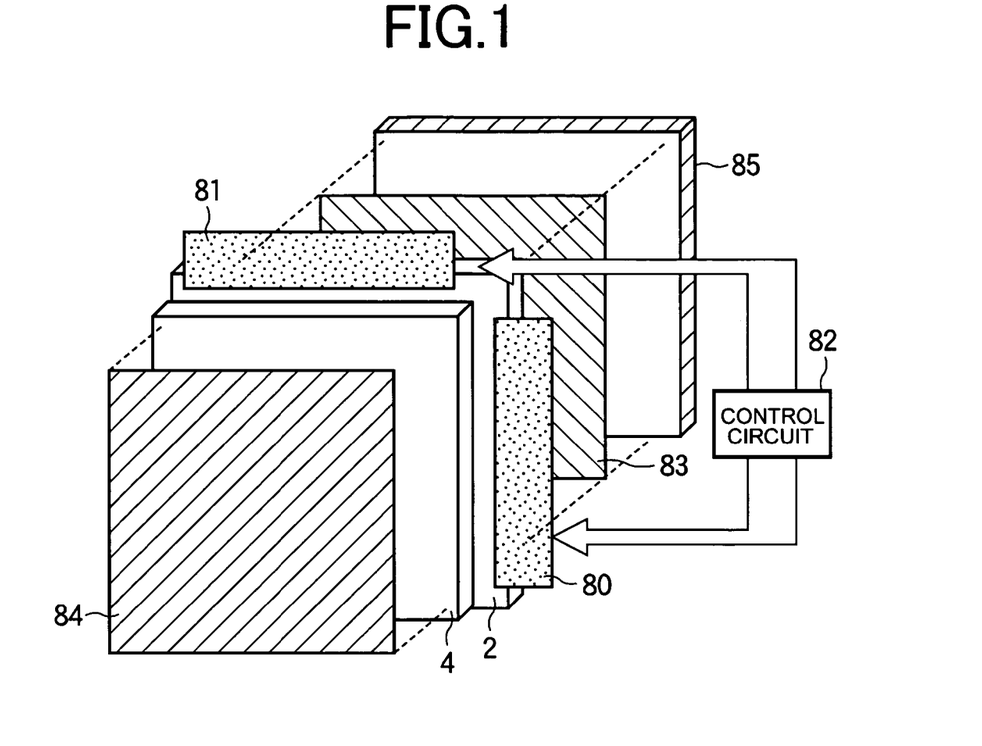
FIG. 1 is a view schematically illustrating the constitution of a liquid crystal display device according to an embodiment of the invention.

Reverting to FIG. 1, on the TFT substrate 2 are provided a gate bus line drive circuit 80 mounting a driver IC for driving the plurality of gate bus lines 12, and a drain bus line drive circuit 81 mounting a driver IC for driving the plurality of drain bus lines 14. In response to predetermined signals output from a control circuit 82, these drive circuits 80 and 81 send scanning signals and data signals to predetermined gate bus lines 12 or to the drain bus lines 14. A polarizer plate 83 is arranged on the surface of the TFT substrate 2 on the side opposite to the element-forming surface thereof, and a backlight unit 85 is mounted on the surface of the polarizer plate 83 on the side opposite to the TFT substrate 2. On the contrary, a polarizer plate 84 is stuck to the surface of the CF substrate 4 on the side opposite to the CF-forming surface.

Figure 3:
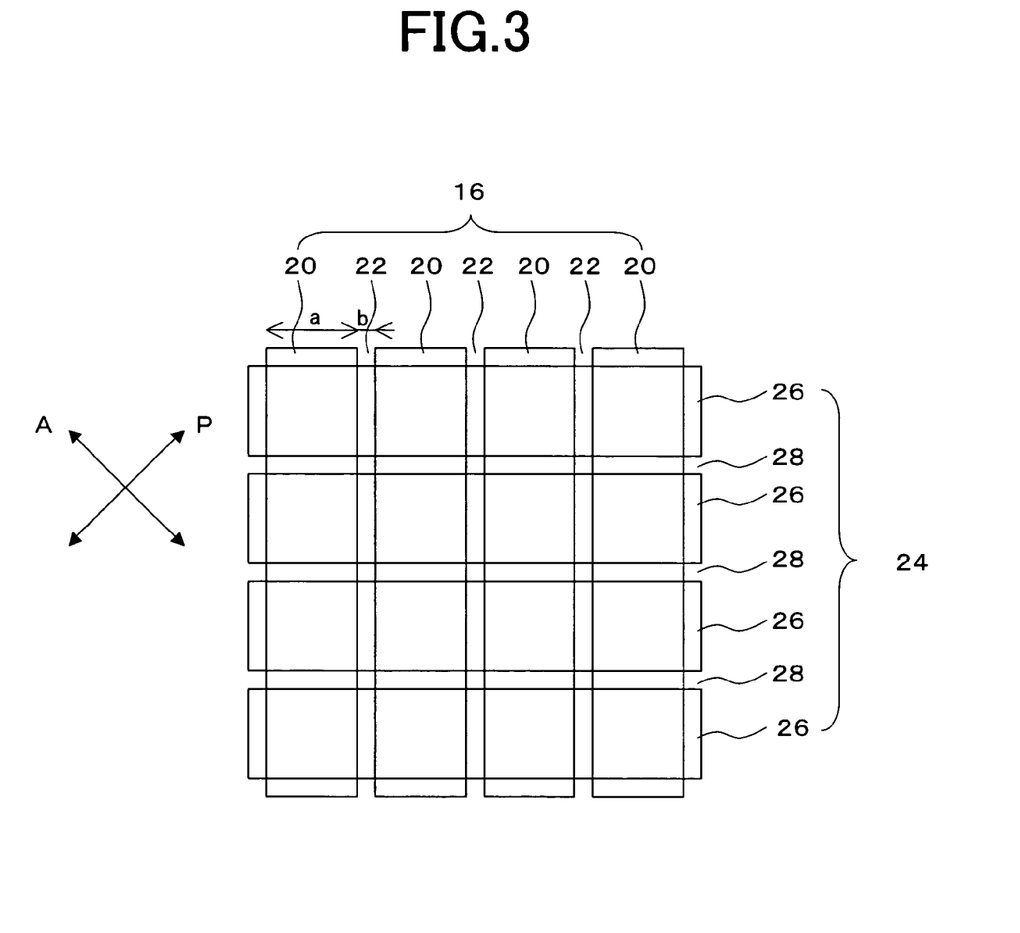
FIG. 3 is a view schematically illustrating the electrode structure of the liquid crystal display device according to the embodiment of the invention.

FIG. 3 illustrates a portion of the electrode constitution of a pixel of the TFT substrate 2 and of the CF substrate 4. Here, for easy comprehension, FIG. 3 does not show TFT 10 or bus lines 12, 14 and 18 that are formed on the side of the TFT substrate 2, and does not show, either, CFs on the side of the CF substrate 4.

In FIG. 3, a pixel electrode 16 of a transparent electrically conducting film such as of ITO (indium tin oxide) is formed on the pixel regions of the TFT substrate 2. The pixel electrode 16 includes a plurality (four in the drawing) of rectangular (belt-like) electrode portions 20 having a width a and extending up and down in the drawing. Among the neighboring electrode portions 20, there are formed slits 22 of a width b without transparent electrically conducting film. The electrode portions 20 separated by slits 22 are electrically connected together through connection electrodes that are not shown.

On the corresponding region of the CF substrate 4 facing the pixel region of the TFT substrate 2, there is formed a common electrode 24 of a transparent electrically conducting film such as of ITO. The common electrode 24 includes a plurality (four in the drawing) of rectangular (belt-like) electrode portions 26 having a width a and extending right and left in the drawing. Among the neighboring electrode portions 26, there are formed slits 28 of a width b without transparent electrically conducting film. The electrode portions 26 separated by slits 28 are electrically connected together through connection electrodes that are not shown. The electrode portions 20 and 26 have a width a of, for example, 37 µm, and the slits 22 and 28 have a width b of, for example, 8 µm.

As described above, the MVA-LCD according to the embodiment comprises the TFT substrate (first substrate) 2 and the CF substrate (second substrate) 4 facing each other maintaining a predetermined cell gap, liquid crystals sealed between the substrates 2 and 4, the pixel electrode (first electrode) 16 formed on the TFT substrate 2 on the side facing the liquid crystals, the common electrode (second electrode) 24 formed on the CF substrate 4 on the side facing the liquid crystals, first slits 22 formed in the pixel electrode 16 and second slits 28 formed in the common electrode 24, and extending in a direction nearly at right angles with the direction in which the first slits 22 are extending as viewed in a direction perpendicular to the substrate surface.

The liquid crystals sealed between the pixel electrode 16 and the common electrode 24 are aligned nearly perpendicularly to the substrate surface when no voltage is applied across the pixel electrode 16 and the common electrode 24, and are regulated for their azimuth of alignment by the first and second slits 22 and 28 when the liquid crystal molecules are tilted by the application of a voltage.

Referring to FIG. 3, further, a nearly square shape is described by the region where there are overlapped the pixel electrode 16 and the common electrode 24 defined by the first and second slits 22 and 28 as viewed in a direction perpendicular to the substrate surface.

The polarizer plate (first polarizer element) 83 arranged on the TFT substrate 2 on the side opposite to the side facing the liquid crystals and the polarizer plate (second polarizer element) 84 arranged on the CF substrate 4 on the side opposite to the side facing the liquid crystals, are arranged in a cross-nicol relationship in which the axis P of absorption of the polarizer plate 83 is nearly at right angles with the axis A of absorption of the polarizer plate 84. Further, the axes P and A of absorption of the polarizer plates 83 and 84 are tilted by about 45° with respect to the directions in which the first and second slits 22 and 28 are extending.

The electrode structure shown in FIG. 3 has electrode portions 20, 26 which are very wider than those of the prior art and first and second slits 22, 28, and is formed without requiring fine patterning in the step of photolithography, and can, further, be produced maintaining a high yield. Besides, the first and second slits 22 and 28 for regulating the alignment of the liquid crystal molecules are formed not only in the pixel electrode 16 but are also formed in the common electrode 24, making it possible to greatly improve the stability of alignment, uniformity and response as compared to those of the conventional structure having slits formed in one electrode only. Further, the first and second slits 22, 28 in the two electrodes are extending in the directions that intersect at right angles. Therefore, there is no need of enhancing the precision at the time of sticking the substrates together.

Figure 4A:
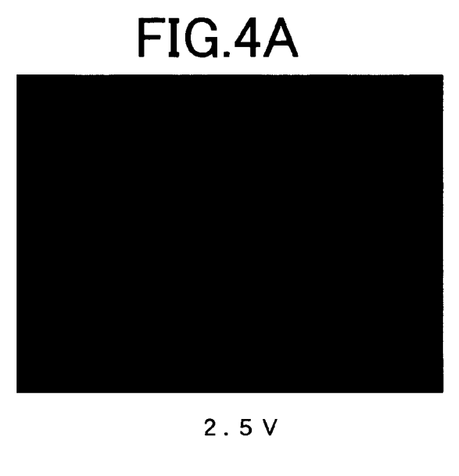
FIGS. 4A to 4D are views illustrating a driving state using the electrode structure of the liquid crystal display device according to the embodiment of the invention.
Figure 4B:
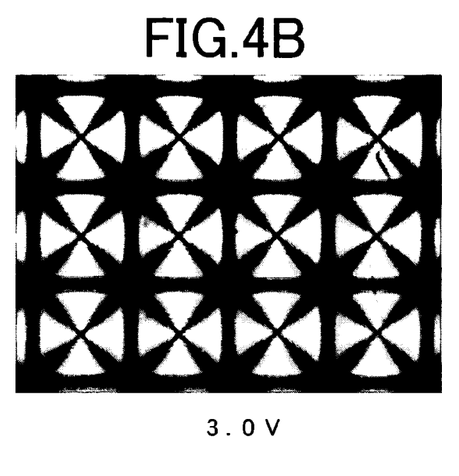
Figure 4C:
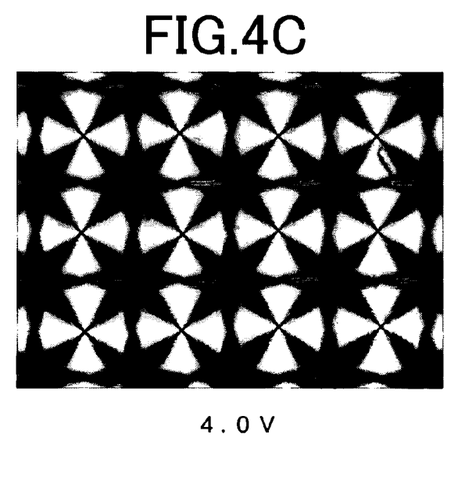
Figure 4D:
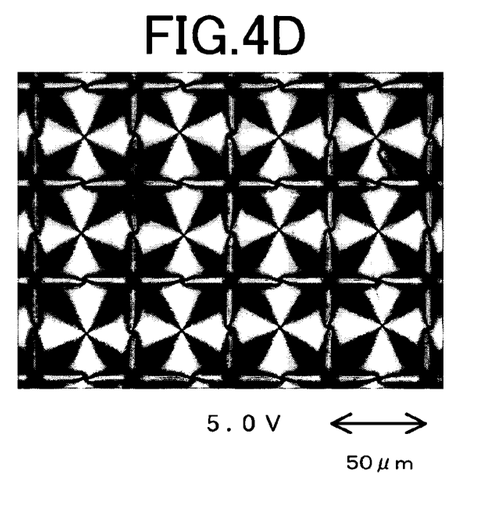

FIGS. 4A to 4D illustrate the alignment of liquid crystals in the liquid crystal display device according to the embodiment of when a voltage is applied thereto. FIG. 4A illustrates a state where the liquid crystals are aligned by applying a voltage of 2.5 V across the electrode portions 20 and 26. Similarly, FIG. 4B illustrates a state where the liquid crystals are aligned by applying a voltage of 3.0 V across the electrode portions 20 and 26, and FIGS. 4C and 4D illustrate states where the liquid crystals are aligned by applying voltages of 4.0 V and 5.0 V. As shown in FIGS. 4A to 4D, stable alignment characteristics are obtained when any voltage is applied, the liquid crystal molecules being aligned at a uniform angle in the regions. This improves the quality of display suppressing flickering or rough feeling on the picture.

Figure 5A:
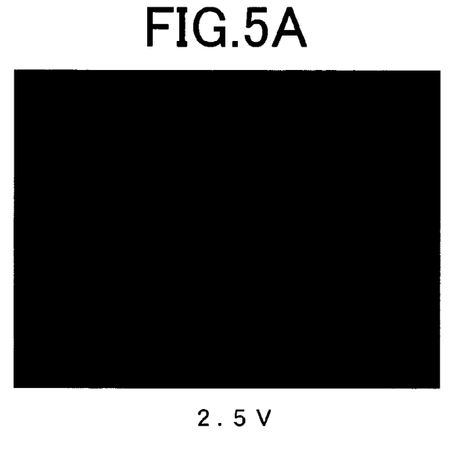
FIGS. 5A to 5D are views illustrating a driving state using another electrode structure of the liquid crystal display device according to the embodiment of the invention.
Figure 5B:
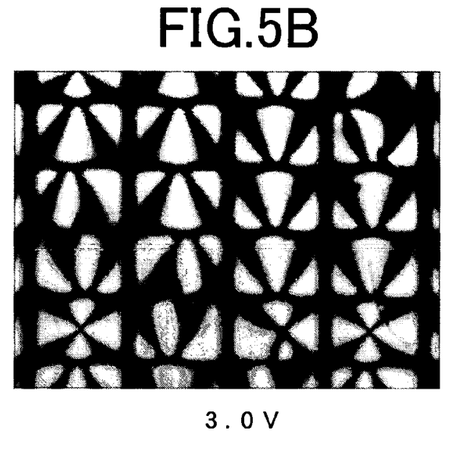
Figure 5C:
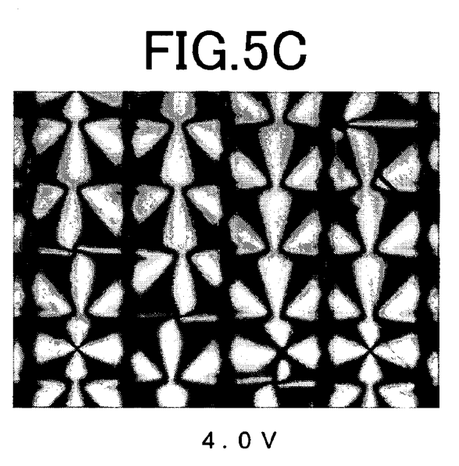
Figure 5D:
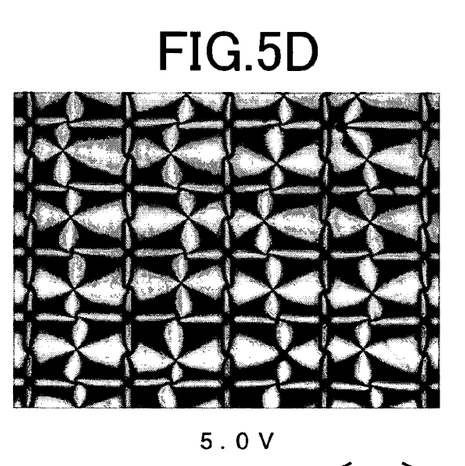

FIGS. 5A to 5D illustrate states of liquid crystal alignment of when a voltage is applied in the electrode structure varying the width of the electrode portions 26. The electrode width a1 of the electrode portion 20 is 37 μm and the slit width b of the slit 22 is 8 μm, while the electrode width a2 of the electrode portion 26 is 25 μm and the slit width b of the slit 28 is 8 μm. As viewed in a direction perpendicular to the substrate surface, a transversely elongated rectangular shape is described by the region where there are overlapped the pixel electrode 16 and the common electrode 24 defined by the first and second slits 22 and 28. FIG. 5A illustrates a state where the liquid crystals are aligned when a voltage of 2.5 V is applied across the electrode portions 20 and 26. Similarly, FIG. 5B illustrates a state where the liquid crystals are aligned when a voltage of 3.0 V is applied across the electrode portions 20 and 26, and FIGS. 5C and 5D illustrate states where the liquid crystals are aligned when voltages of 4.0 V and 5.0 V are applied. As shown in FIGS. 5A to 5D, when a rectangular shape is described by the region where the pixel electrode 16 and the common electrode 24 are overlapped one upon the other, it will be learned that the stability and uniformity of alignment of the liquid crystal molecules are lowered as compared to those of the structure of a square shape shown in FIGS. 4A to 4D. It is, therefore, desired that the region where the pixel electrode 16 and the common electrode 24 are overlapped one upon the other, describes nearly a square shape.

Here, the liquid crystal display device (MVA-LCD) according to the embodiment described with reference to FIGS. 1 to 4D has a defect of decreased transmission factor, since the amount of light attenuates when it is transmitted from the liquid crystal molecules aligned in the azimuths other than 45° with respect to the axes P and A of absorption of the polarizer plates 83 and 84. In order to improve this defect, there has been known a method of arranging a first ¼ wavelength plate 30 and a second ¼ wavelength plate 32 on both sides of the liquid crystal panel as shown in FIG. 6 (see, for example, Papers in the Panel Discussion, Japanese Association of Liquid Crystals, by Iwamoto, Toko, Iimura, PCa02, 2000).

Figure 6:
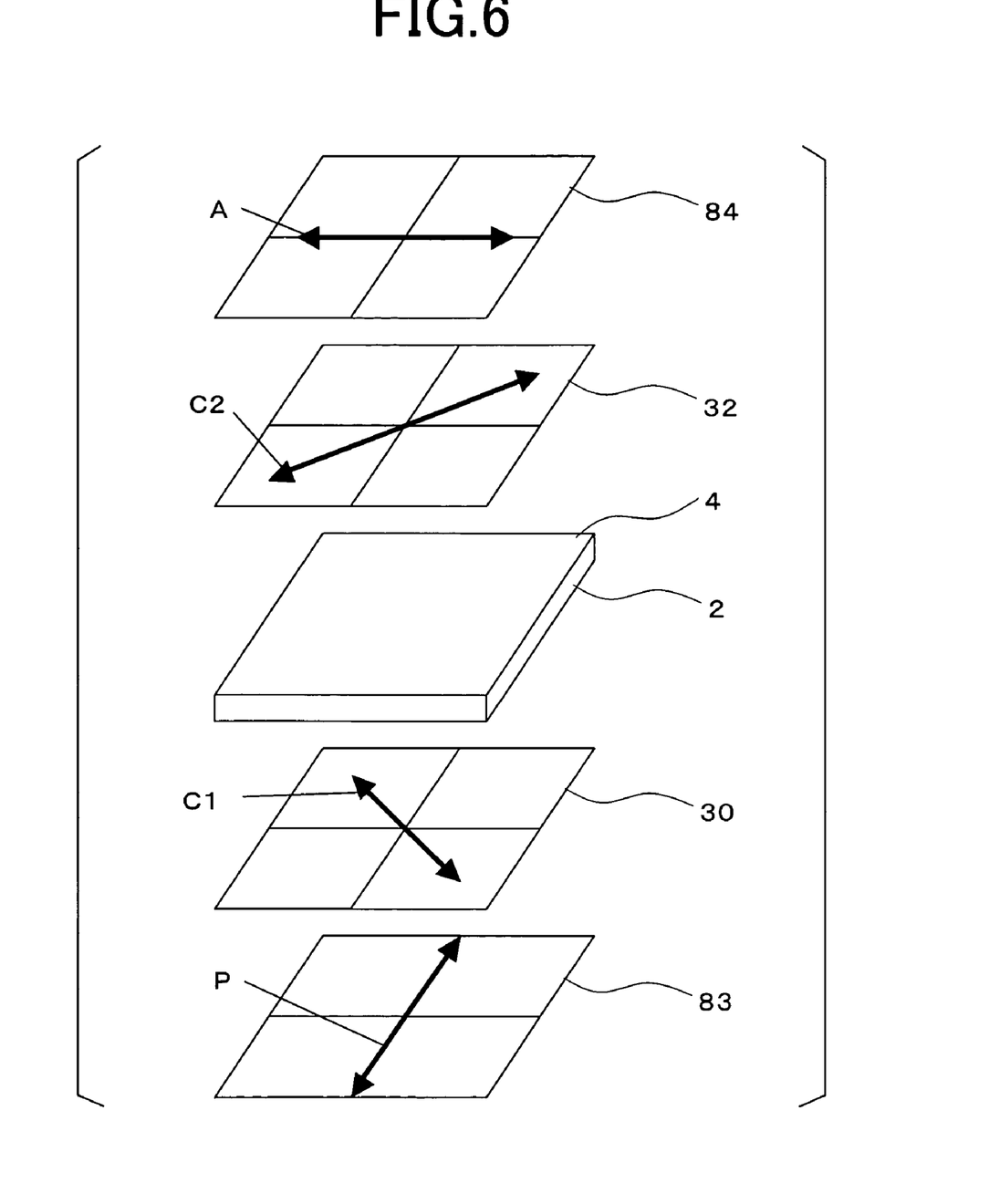
FIG. 6 is a view illustrating a positional relationship between polarizer elements and ¼ wavelength plates in the liquid crystal display device according to the embodiment of the invention.

Referring to FIG. 6, the polarizer plates 83 and 84 are arranged in a cross-nicol relationship to each other holding the liquid crystal panel (TFT substrate 2, CF substrate 4 and liquid crystal layer held thereby) therebetween. The ¼ wavelength plate 30 is arranged between the liquid crystal panel and the polarizer plate 83. Further, the ¼ wavelength plate 32 is arranged between the liquid crystal panel and the polarizer plate 84. In order to improve the viewing angle characteristics, a layer having a negative phase difference, such as TAC film may be arranged between the liquid crystal panel and the ¼ wavelength plates 30, 32. In the drawing, the upper side is the side of the observer and the lower side is the side of the source of light.

An angle of about 45° is subtended by the optical axis (retardation axis) C1 of the ¼ wavelength plate 30 and the axis P of absorption of the polarizer plate 83. Namely, a circularly polarized light is obtained as the light emitted from the source of light passes through the polarizer plate 83 and the ¼ wavelength plate 30 in this order. Further, an angle of about 45° is subtended by the optical axis C2 of the ¼ wavelength plate 32 and the axis A of absorption of the polarizer plate 84. The optical axes P and A of the two ¼ wavelength plates 30 and 32 are intersecting each other nearly at right angles.

In the arrangement shown in FIG. 6, if the intensity of the incident light is denoted by $I_{in}$, the intensity of the transmitted light by $I_{out}$, and the retardation through the liquid crystal layer by $R_{LC}$, then, the following relationship holds, $$I_{out}=(\tfrac{1}{2})I_{in}\sin^2(R_{LC}/2)$$

That is, if the intensity $I_{in}$ of the incident light is presumed to be constant, then, the intensity $I_{out}$ of the transmitted light is determined exclusively by $R_{LC}$. Namely, the intensity $I_{out}$ of the transmitted light is dependent upon the tilted angle of the liquid crystal molecules that vary the retardation $R_{LC}$ but is not dependent upon the azimuth of alignment of the liquid crystal molecules.

Employment of the above constitution makes it possible to extinguish the regions of low transmission factors that occur in the form of a lattice or in an X-shape as shown in FIGS. 4A to 4D and, hence, to realize an MVA-LCD having a sufficiently high light transmission factor.

Figure 7:
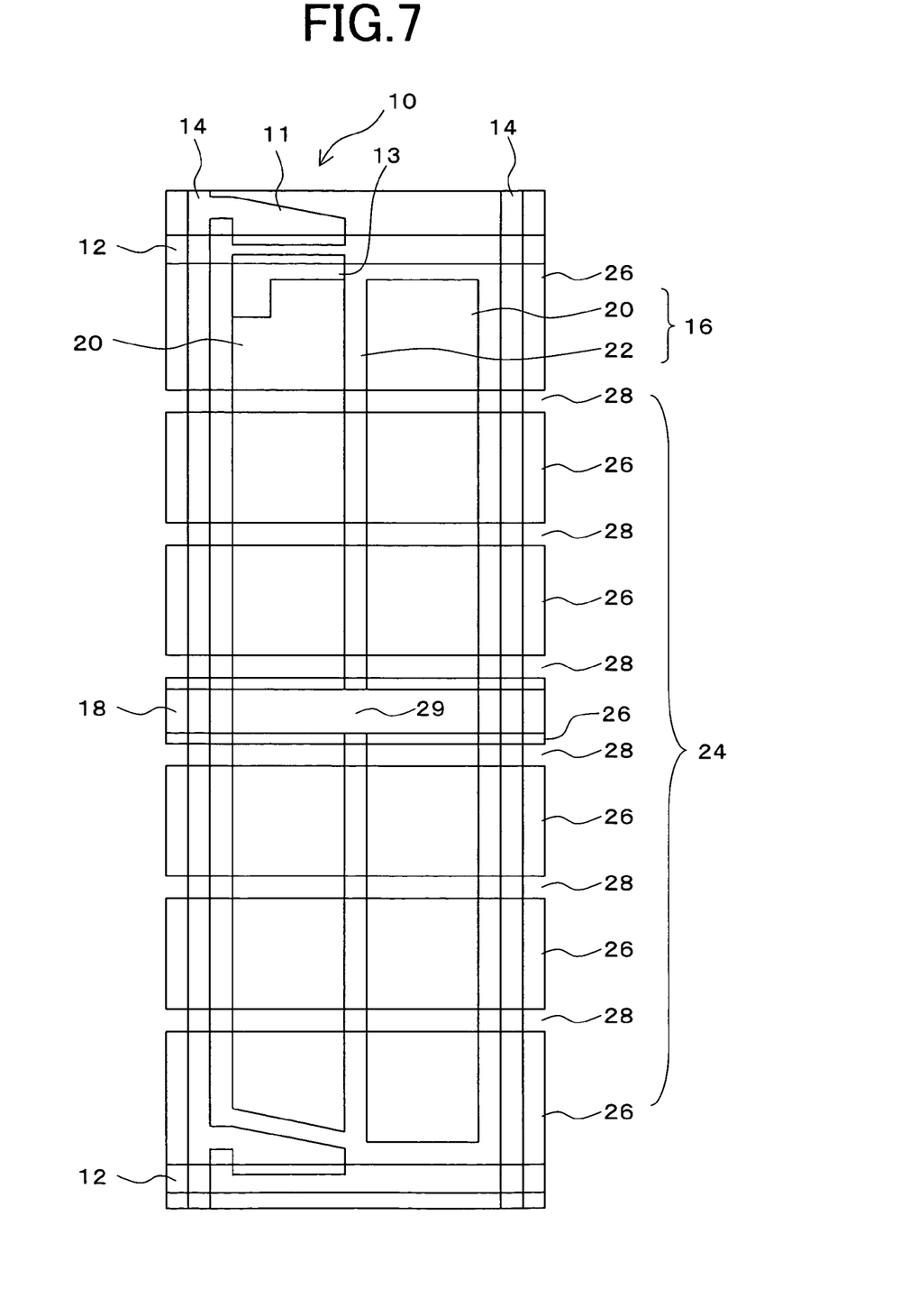
FIG. 7 is a view schematically illustrating a further electrode structure in the liquid crystal display device according to the embodiment of the invention.

FIG. 7 illustrates the electrode structure of a modified embodiment in the liquid crystal display device according to the invention. Referring to FIG. 7, there are formed, on the TFT substrate, a plurality of gate bus lines 12 nearly in parallel with each other extending in the right-and-left direction in the drawing. A plurality of drain bus lines 14 are formed nearly in parallel with each other extending in the up-and-down direction in the drawing intersecting the gate bus lines 12 via an insulating film that is not shown. The regions surrounded by the plurality of gate bus lines 12 and drain bus lines 14 serve as pixel regions.

There are further formed storage capacitor bus lines 18 traversing nearly the centers of the pixel regions and extending nearly in parallel with the gate bus lines 12.

A TFT 10 is formed near a position where the gate bus line 12 intersects the drain bus line 14. A drain electrode 11 of TFT 10 is drawn from the drain bus line 14 and is positioned on one end side of an active semiconductor layer (not shown) formed on the gate bus line 12 and on one end side of a channel protection film (not shown) formed thereon. On the other hand, a source electrode 13 of TFT 10 is facing the drain electrode 11 maintaining a predetermined gap, and is positioned on the other end side of the active semiconductor layer and of the channel protection film. The region just under the channel protection film of the gate bus line 12 works as a gate electrode of TFT 10. Further, the source electrode 13 is electrically connected to the electrode portion 20 on the left side in the drawing of the pixel electrode 16 that will be described later through a contact hole (not shown).

The pixel electrode 16 of a transparent electrically conducting film such as of ITO is formed on the pixel regions of the TFT substrate 2. The pixel electrode 16 is formed in a rectangular shape with its long side extending in the up-and-down direction in the drawing, and has two rectangular (belt-like) electrode portions 20 extending up and down in the drawing maintaining the same width. A slit 22 of a predetermined width is formed between the neighboring electrode portions 20, the slit 22 without having no transparent electrically conducting film and extending in the direction of long side of the pixel electrode 16. The two electrode portions 20 separated by the slit 22 are electrically connected together through, for example, a connection electrode 29 formed on the storage capacitor bus line 18.

The common electrode 24 of a transparent electrically conducting film such as of ITO is formed on the corresponding region of the CF substrate 4 facing the pixel regions of the TFT substrate 2. The common electrode 24 has a plurality of (seven in the drawing) rectangular (belt-like) electrode portions 26 having a predetermined width and extending in the right-and-left direction in the drawing. Slits 28 are formed among the neighboring electrode portions 26, the slits 28 without having transparent electrically conducting film. The electrode portions 26 separated by the slit 28 are electrically connected together through a connection electrode that is not shown.

As described above, the MVA-LCD of the modified embodiment includes the TFT substrate (first substrate) 2 and the CF substrate (second substrate) 4 arranged facing each other maintaining a predetermined cell gap, and liquid crystals sealed between the substrates 2 and 4. The liquid crystals are nematic liquid crystals having a negative dielectric anisotropy. Further, the MVA-LCD of the modified embodiment includes the pixel electrode (first electrode) 16 formed on the TFT substrate 2 on the side facing the liquid crystals, the common electrode (second electrode) 24 formed on the CF substrate 4 on the side facing the liquid crystals, the first slits 22 formed in the pixel electrode 16, and the second slits 28 formed in the common electrode 24 and stretching in a direction nearly at right angles with the direction in which the first slits 22 are extending as viewed in a direction perpendicular to the substrate surface.

The liquid crystals sealed between the pixel electrode 16 and the common electrode 24 are aligned nearly vertically to the substrate surface when no voltage is applied across the pixel electrode 16 and the common electrode 24, but are regulated for their azimuths of alignment by the first and second slits 22 and 28 when the liquid crystal molecules are tilted by the application of a voltage.

As shown in FIG. 7, further, a nearly square shape is described by the region where there are overlapped the pixel electrode 16 and the common electrode 24 defined by slits 22 and 28 as viewed in a direction perpendicular to the substrate surface.

Further, the cross-nicol arrangement is employed such that the axis P of absorption of the polarizer plate (first polarizer element) 83 arranged on the TFT substrate 2 on the side opposite to the side that faces the liquid crystals is nearly at right angles with the axis A of absorption of the polarizer plate (second polarizer element) 84 arranged on the CF substrate 4 on the side opposite to the side that faces the liquid crystals. The axes P and A of the polarizer plates 83 and 84 are tilted by about 45° with respect to the directions in which the first and second slits 22 and 28 are extending.

The first ¼ wavelength plate 30 shown in FIG. 6 is arranged between the TFT substrate 2 and the polarizer plate 83, and the second ¼ wavelength plate 32 shown in FIG. 6 is arranged between the CF substrate 4 and the polarizer plate 84. Further, the axis P of absorption of the polarizer plate 83 is 45° with respect to the retardation axis C1 of the first ¼ wavelength plate 30, the axis A of absorption of the polarizer plate 84 is 45° with respect to the retardation axis C2 of the second ¼ wavelength plate 32, and the retardation axis C1 of the first ¼ wavelength plate 30 is nearly at right angles with the retardation axis C2 of the second ¼ wavelength plate 32.

The electrode structure shown in FIG. 7 has electrode portions 20, 26 which are very wider than those of the prior art and first and second slits 22, 28, and is formed without requiring fine patterning in the step of photolithography when the electrode is formed, and can, further, be produced maintaining a high yield. Besides, the slits 22 and 28 for regulating the alignment of the liquid crystal molecules are formed not only in the pixel electrode 16 but also in the common electrode 24, making it possible to greatly improve the stability of alignment, uniformity and response as compared to those of the conventional structure having slits formed in one electrode only. Further, the first and second slits 22, 28 in the two electrodes are extending in the directions that intersect at right angles. Therefore, there is no need of enhancing the precision at the time of sticking the substrates together.

According to this modified embodiment, stabilized alignment properties are obtained when any voltage is applied, and the liquid crystal molecules can be aligned being tilted at a uniform angle in the regions. Therefore, the quality of display can be improved suppressing the flickering and rough feeling in the image. Besides, a bright display is obtained since the transmission factor is more improved than with the MVA-LCD shown in FIGS. 1 to 4D. If the same brightness is maintained, the source of light needs emit light in a decreased amount, and the MVA-LCD consumes the electric power in decreased amounts.

In the modified embodiment, too, the electrodes on both substrates are patterned to form slits, the slits on both sides intersecting at right angles with each other. Therefore, the stability of alignment, uniformity and response are greatly improved as compared to the case where the electrodes are patterned on the substrate on one side only. This makes it possible to realize a liquid crystal display device featuring a wide viewing angle and high brightness yet improving the yield of production.

The invention can be modified in a variety of ways not being limited to the above embodiment only.

The above embodiment uses the CF substrate obtained by forming CFs on the opposing substrate. Not being limited thereto only, however, the invention can also be applied even to the MVA-LCD of a so-called CF-on-TFT structure forming CFs on the TFT substrate, as a matter of course. The electrode structure of the present invention can also be applied to the reflection-type MVA-LCD using a reflecting electrically conducting film as the pixel electrode or to the translucent-type MVA-LCD having, for example, a transparent electrode and a reflecting electrode in combination.

A square shape needs not necessarily be described by the region where there are overlapped the common electrode 24 and the pixel electrode 16 one upon the other in the above embodiment and in the modified embodiment. Pitches of slits 22 and 28 formed in the common electrode 24 and in the pixel electrode 16 may be suitably changed depending upon the size of the pixels, etc.

According to this invention as described above, there is realized a liquid crystal display device which features an improved production yield, wide viewing angle, high brightness and favorable display quality.

What is claimed is:

1. A liquid crystal display device comprising:
    a first substrate and a second substrate facing each other and maintaining a predetermined cell gap;
    liquid crystals sealed between the first substrate and the second substrate;
    a plurality of first electrodes formed on the first substrate on the side that faces the liquid crystals, wherein the plurality of first electrodes comprise only a plurality of first slits extending substantially parallel with respect to each other in a plurality of pixel region; and
    a second electrode formed on the second substrate on the side that faces the liquid crystals, wherein the second electrode comprises only a plurality of second slits intersecting with and extending in a direction substantially at right angles of the first slits in the plurality of pixel regions, as viewed in a direction perpendicular to the substrate surface.

2. A liquid crystal display device according to claim 1, wherein the liquid crystal molecules are aligned nearly perpendicularly to the surface of the substrate when no voltage is applied across the first electrodes and the second electrode, and are regulated for their azimuths of alignment by the first and second slits when being tilted by the application of a voltage.

3. A liquid crystal display device according to claim 1, wherein each of the first electrodes is a pixel electrode formed for each of a plurality of pixel regions, and the second electrode is a common electrode formed on the display region including the plurality of the pixel regions.

4. A liquid crystal display device according to claim 3, wherein the pixel electrode has a rectangular shape, and the first slits extend in a direction of a long side of the pixel electrode.

5. A liquid crystal display device according to claim 1, wherein a substantially square shape is defined in a region where there is an overlapping of a pair of the first slits and a pair of second slits as viewed in a direction perpendicular to the surface of the substrate.

6. A liquid crystal display device according to claim 1, further comprising:
    a first polarizer element arranged on the first substrate on the side opposite to the side that faces the liquid crystals; and
    a second polarizer element arranged on the second substrate on the side opposite to the side that faces the liquid crystals, and having an axis of absorption nearly at right angles with the axis of absorption of the first polarizer element.

7. A liquid crystal display device according to claim 6, further comprising:
    a first ¼ wavelength plate arranged between the first substrate and the first polarizer element; and
    a second ¼ wavelength plate arranged between the second substrate and the second polarizer element.

* * * * *